Feb. 26, 1929.

W. H. T. HOLDEN 1,703,147

RECTIFIER ALARM SYSTEM

Original Filed May 5, 1924    2 Sheets-Sheet 1

INVENTOR
W.H.T.Holden
BY
ATTORNEY

Patented Feb. 26, 1929.

1,703,147

UNITED STATES PATENT OFFICE.

WILLIAM H. T. HOLDEN, OF BROOKLYN, NEW YORK, ASSIGNOR TO AMERICAN TELEPHONE AND TELEGRAPH COMPANY, A CORPORATION OF NEW YORK.

RECTIFIER ALARM SYSTEM.

Original application filed May 5, 1924, Serial No. 711,302. Divided and this application filed October 9, 1925. Serial No. 61,609.

This invention relates to voltage rectifying systems, and particularly to means for indicating failure of the system to rectify the applied alternating voltage.

This is a division of the copending application Serial No. 711,302, filed May 5, 1924.

In the operation of a system designed to rectify an alternating voltage so that a uni-directional voltage may thereby be produced which may be utilized, for example, to charge a storage battery, it is important that any failure of the rectifying device to properly rectify the applied alternating voltage may be instantly known.

It is the object of this invention to provide a method and means for instantly indicating any failure of a rectifying device to properly rectify the plate voltage.

Figure 1:
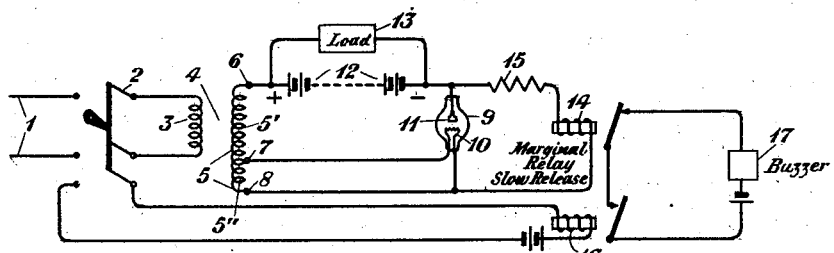
Figure 2:
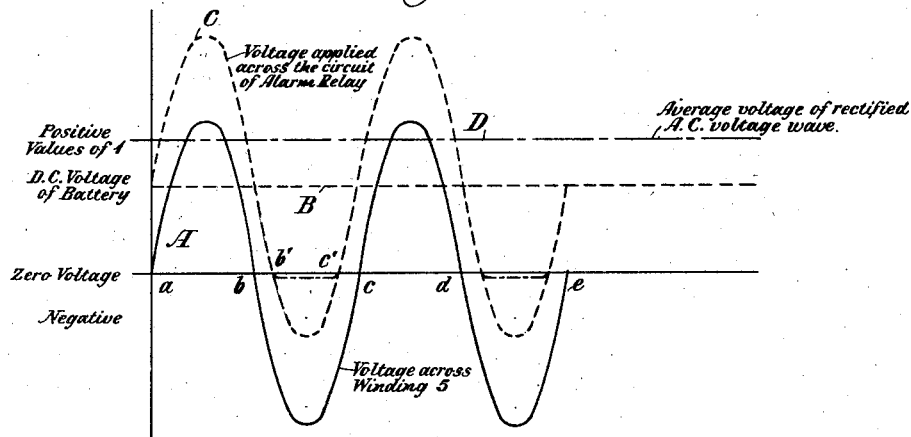
Figure 3:
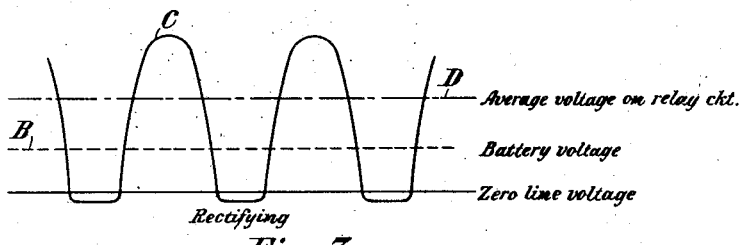
Figure 4:
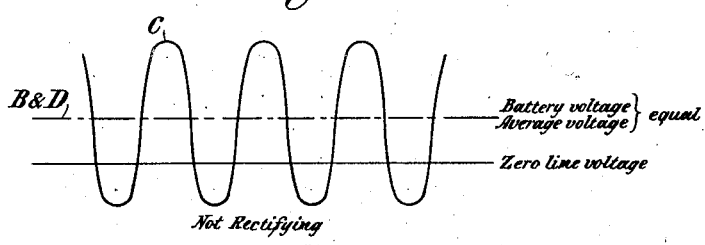
Figure 5:
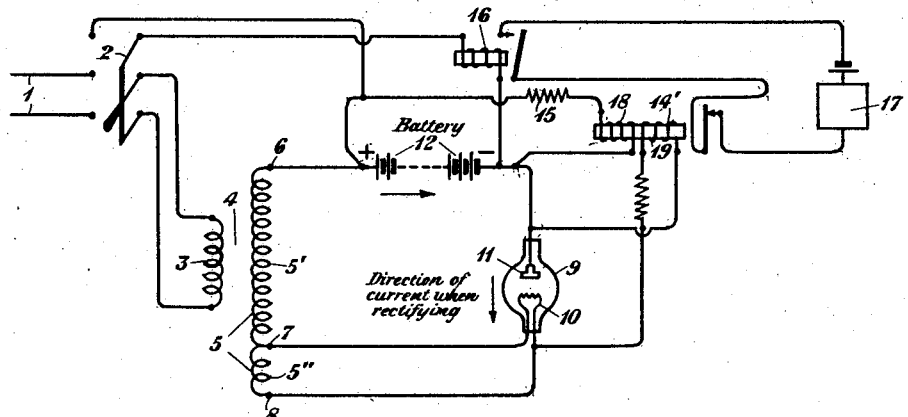
Figure 6:
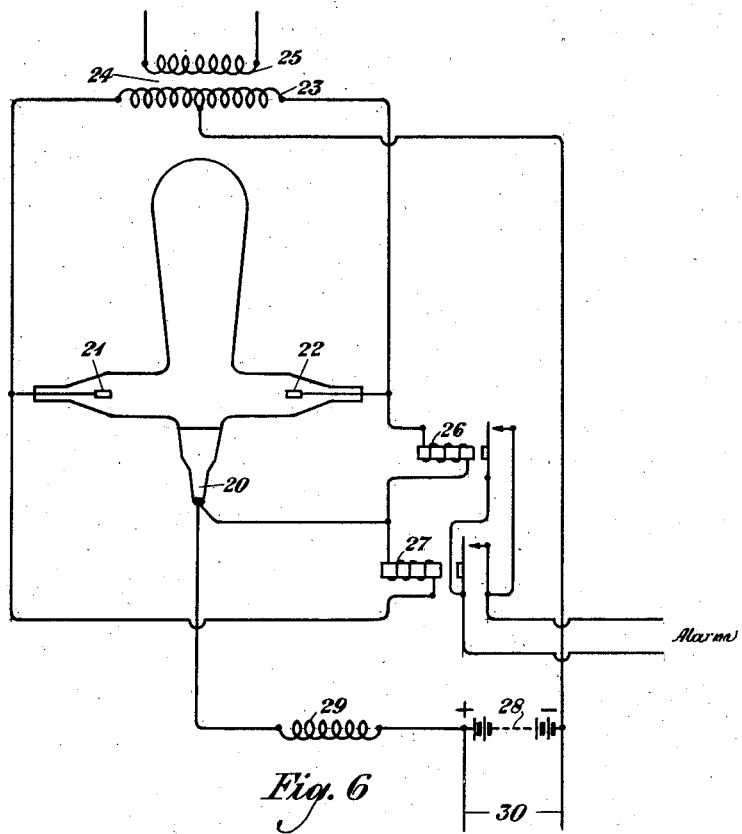

Other objects of this invention will be apparent from the following description when read in connection with the attached drawing of which Figure 1 shows the invention in its simplest form; Figs. 2, 3 and 4 show graphically the principle of operation of the invention; and Figs. 5 and 6 show other forms of embodiment of the invention.

In Fig. 1, a source 1 of alternating voltage is adapted to be connected by means of certain blades of the single throw triple pole switch 2 with the primary winding 3 of the transformer 4. The secondary winding 5 of this transformer which includes all of the turns between the terminals 6 and 7, is effectively connected across the electrodes of the rectifying device 9. That portion of the winding 5 designated at 5'' is used to furnish the current necessary for heating the cathode 10 of the rectifier. The battery 12, which is to be charged by the unidirectional current produced by the rectifying system, is connected between the anode 11 and the terminal 6 of the winding 5. A load 13 is connected across the terminals of the battery 12. Connected across the anode and cathode of the rectifier 9 is a marginal relay 14 in series with a controlling resistance 15. This marginal relay, which is preferably of the slow release type, is intended to operate upon the margin existing between the voltage of the battery 12 and the average alternating voltage when the device 9 is properly rectifying. The relay 16, which operates whenever the switch 2 is closed and which is deenergized when the said switch is open, is intended to prevent the continuous operation of the alarm device 17 when the rectifier 9 is intentionally stopped from operating.

The manner in which this circuit operates to carry out the invention will be clearly understood from the foregoing description considered in connection with the diagrams shown in Figs. 2, 3 and 4. Let it be assumed that the switch 2 is closed, so that an alternating voltage will be applied by the winding 3 to the winding 5. This alternating voltage is represented in Fig. 2 by A. Since the battery 12 is in the same circuit as winding 5, the voltage across winding 5 will be superimposed upon the voltage of the battery 12 represented by B of Fig. 2. If there were no rectifying device connected with the circuits, the resultant voltage applied to the marginal relay would have the form of the dotted wave represented by C of Fig. 2. As is well known, the superposition of the alternating wave upon the direct current voltage results, in effect, in a shifting of the zero axis of the alternating wave. For a symmetrical wave, the line representing the average value of successive half waves is, of course, the zero axis of the wave and this would coincide with the line representing the direct current voltage B. The proper operation of the rectifying device 9 in the circuit causes unsymmetrical half waves, and the line representing the average value of the alternating voltage wave will not coincide with the line of the direct voltage. This difference of voltage, represented by the separation of the two lines, maintains the marginal relay operated and thereby prevents the operation of the buzzer 17 by keeping the circuit of the latter open.

For a clearer understanding of this, consider that during the interval $a$—$b$ of the voltage wave A, the terminal 8 of the winding 5 is positive with respect to its terminal 6. With the battery 12 poled as shown in Fig. 1, the alternating voltage during this half cycle will add to the direct voltage, and the resultant voltage, represented by the half cycle of the wave C, will be applied between the cathode 10 and the anode 11 of the rectifier 9, making the cathode positive to the anode. Accordingly, no current will flow across the gap between these electrodes, and consequently the full potential represented by C will be applied to the circuit of the marginal relay 14. During the half cycle represented by the interval *b—c*, the alternating voltage will oppose the direct voltage of the battery 12, but the polarity of the anode 11 will not become positive until the instant *b'* is reached when the alternating voltage exactly equals the direct voltage. During the interval *b' c'*, the anode 11 will remain positive with respect to its cathode 10, and in consequence thereof a flow of current will take place across the gap of the rectifier 9, causing the voltage across the electrodes to drop substantially to zero. This drop in the voltage is represented by the dot and dash line extending across the trough of the wave C between the points *b' c'*. At the point *c'* the alternating and direct voltages again become equal, and thereafter the anode 11 is negative with respect to its cathode so that further current flow through the tube ceases.

If the tube 9 is functioning properly, current will flow therethrough during some part of every other half cycle, and during the interval in which such current flow takes place the voltage across the electrodes will drop substantially to zero. As stated heretofore, the voltage across the circuit including the marginal relay 14 is the voltage across the electrodes of the rectifier. When the tube is functioning properly, this voltage has the form represented by the wave of Fig. 3, and since the half waves are unsymmetrical with respect to their zero axis, that is, the line which coincides with the line representing the direct voltage B, the average value of successive half waves will not be represented by a line coinciding with the line B, but will be displaced and may be represented by the line D. The marginal relay 14 is adjusted to be operated at the voltage represented by D and not to operate at the voltage represented by B. Accordingly, when the rectifier is operating properly, this marginal relay remains operated by virtue of the excess voltage, and by holding up its armature it maintains open the circuit of the buzzer 17. It should be remembered that, upon the closing of switch 2, relay 16 is operated and its armature remains pulled up, so that the future control of the circuit of the buzzer 17 resides in the marginal relay. If the rectifier 9 fails to rectify, viz., current does not flow between the electrodes during the interval *b' c'*, the voltage across these electrodes will therefore not drop to zero, as represented by the dot and dash line, but it will be maintained throughout that portion of the cycle as represented by the dotted line. Accordingly, the successive half waves of the curve C will be symmetrical with regard to their axis, which, as stated, coincides with the line B, and since the half waves are symmetrical, this line represents the average value of the successive half cycles. This means that the average value of the wave C coincides with the direct voltage B, and accordingly there is no margin of voltage to maintain operated the marginal relay 14. This relay will accordingly be released, and its armature will fall back, closing the circuit of the buzzer 17, which will indicate to an attendant that the rectifier 9 is not functioning properly. Upon opening the switch 2 in order to disconnect the source of alternating voltage from the rectifying system, the circuit of relay 16 will be opened, which, in turn, will open the circuit of the buzzer 17 and discontinue the giving of the alarm. The function of relay 16 is to prevent the continuous operation of the buzzer during the time in which the rectifier is purposely not operating. The coincidence of average voltage of the wave C and of the direct voltage B is represented in Fig. 4.

The arrangement shown in Fig. 5, in which the same reference characters have been used to designate the same parts as shown in Fig. 1, differs from that shown in Fig. 1 principally in the use of a differential relay in place of the marginal relay shown in Fig. 1. The differential relay 14' has one winding 18 connected across the terminals of the battery 12. Another winding 19, differential with respect to the first winding, is connected across the electrodes of the rectifier 9. The remainder of the circuit is substantially as shown in Fig. 1. This arrangement is intended to insure proper operation of the alarm relay in case the battery voltage increased, due to its being charged, and thus cut down the margin between the direct current potential of the battery and the average alternating voltage of the unsymmetrical wave, i. e., the partly rectified wave. By the use of a device operating upon the differential the difficulty arising from an increased battery voltage would be avoided. It is believed that the arrangement shown in Fig. 5 in which the alarm circuit is more sensitive to variations in voltage, constitutes a more practical form of the invention.

Fig. 6 shows the application of the invention to a mercury arc rectifier having a cathode 20 and two anodes 21 and 22. These anodes are connected with the secondary 23 of the transformer 24, the primary 25 of which is connected with a source of alternating potential. The mode of connection is that well known in the art for the purpose of obtaining rectification of successive half waves. Connected between the anode 22 and the cathode 20 is a relay 26, and similarly connected between the anode 21 and the cathode 20 is a relay 27, which controls the alarm circuit. Connected between the cathode 20 and the midpoint of the winding 23 is the battery 28 in series with the sustaining coil 29. A work circuit 30 is shown connected across the battery 28. The manner in which this circuit operates is substantially that described in connection with Fig. 1. If the device is rectifying properly, the voltage between the anodes and the cathode will drop substantially to zero during the discharge of current therebetween. In the event that the device is not functioning properly, the voltage between each anode and its cathode will be maintained throughout the half cycles in which rectification is supposed to take place, and accordingly there will be no margin of voltage to maintain operated the relays 26 and 27. Either or both of these will be released, and the alarm will be set in operation.

While this invention has been disclosed as embodied in particular forms, it is to be understood that it is capable of embodiment in other and different forms without departing from the spirit and scope of the appended claims.

What is claimed is:

1. In a system for indicating the failure of a voltage rectifier to rectify, the combination with a rectifier of a source of alternating current to be rectified connected thereto, a source of direct current voltage connected across the said rectifier and the said source of alternating current in series, a differential relay, one winding of which is connected across said source of direct current voltage and the other winding across the electrodes of the said rectifier responsive to a difference between the direct current voltage and the average of the rectified alternating voltage plus the said direct current voltage, and an alarm signal controlled by the said differential relay.

2. In a system for indicating the failure of a voltage rectifier to rectify, the combination with a rectifier of a source of alternating current to be rectified connected thereto, a source of direct current voltage connected across the said rectifier and the said source of alternating current in series, a differential relay, one winding of which is connected across said source of direct current voltage and the other winding across the electrodes of the said rectifier responsive to a difference between the direct current voltage and the average of the rectified alternating voltage plus the said direct current voltage, an alarm signal controlled by the said differential relay, and a second relay to maintain open the circuit of the alarm signal whenever the alternating voltage is not being supplied to the rectifier.

3. In a voltage rectifying system, the combination with a voltage rectifier of a source of direct current potential connected therewith, a source of alternating potential connected with the said rectifier and the said source of direct current potential adapted to superimpose its voltage upon the said direct current voltage, and a differential relay responsive to the difference between the voltage of the direct current voltage and the average of the rectified alternating voltage plus the said direct current voltage to control the operation of an alarm signal.

4. In a system for indicating the failure of a voltage rectifier to rectify, the combination with a rectifier of a source of alternating voltage, a source of direct current voltage connected with said rectifier to be charged by the rectified alternating voltage, means to superimpose said alternating voltage upon the direct current voltage, a differential relay of which one winding is effectively connected across the source of direct current voltage, and the other winding across the electrodes of the said rectifier, and an alarm signal controlled by the said differential relay to indicate failure of the device to rectify.

In testimony whereof, I have signed my name to this specification this 1st day of October, 1925.

WILLIAM H. T. HOLDEN.